United States Patent [19]

De Groote et al.

[11] Patent Number: 5,469,464
[45] Date of Patent: Nov. 21, 1995

[54] TRANSMISSION SYSTEM FOR TRANSMITTING SIGNALS IN A BURST MODE

[75] Inventors: Jan L. B. De Groote, Schilde; Jan A. O. Vandewege, Gent; Joost Allaert, Kortrijk; Hans A. G. Van Parys, Oostkamp, all of Belgium

[73] Assignee: Alcatel, N.V., Rijswijk, Netherlands

[21] Appl. No.: 118,528

[22] Filed: Sep. 9, 1993

[30] Foreign Application Priority Data

Sep. 9, 1992 [EP] European Pat. Off. ............... 92202737

[51] Int. Cl.⁶ .............................. H04L 25/06; H04L 25/10
[52] U.S. Cl. ......................... 375/317; 375/345; 455/234.1
[58] Field of Search .................................. 375/58, 76, 98; 359/161, 164, 194, 189; 330/11; 455/234.1, 239.1; 328/149; 307/358, 360, 363, 364

[56] References Cited

U.S. PATENT DOCUMENTS

| | | | |
|---|---|---|---|
| 4,768,204 | 8/1988 | Zeiss | 375/98 |
| 5,052,021 | 9/1991 | Goto et al. | 375/76 |
| 5,060,302 | 10/1991 | Grimes | 359/161 |
| 5,097,486 | 3/1992 | Newby et al. | 375/76 |
| 5,303,416 | 4/1994 | Morera | 375/76 |

OTHER PUBLICATIONS

"Burst–Mode Compatible Optical Receiver With a Large Dynamic Range", Y. Ota et al., *Journal of Lightwave Technology*, vol. 8, No. 12, Dec. 1990, pp. 1897–1903.

*Primary Examiner*—Stephen Chin
*Assistant Examiner*—Timothy J. May
*Attorney, Agent, or Firm*—Ware, Fressola, Van Der Sluys & Adolphson

[57] ABSTRACT

The receiver processing circuitry performs the steps of an iterative process and in each step derives from a received signal Iin a threshold value related to a characteristic of the signal. This value is stored via an analog-to-digital convertor AD in a memory MEM. The characteristic of the signal Iin is then compared in a comparator consisting of two comparator circuits C1 and C2 and a switch S, with a threshold value stored previously for the substation which sent Iin. This value is prior to receipt of Iin, i.e. during a previous timeslot, applied to, e.g., C1 via a digital-to-analog convertor DA1. During this comparison a threshold stored for the substation which is next to transmit a signal is retrieved from MEM via a digital-to-analog convertor DA2. The result of the comparison is via S generated at Dout and represents the digital conversion of Iin. The power of the transmitted signals is controlled by a circuit included in the transmitters of the system. This circuit compares the peak power values of a maintenance signal coupled back via a backfacet diode D with reference values REF1 and REF2 and controls a laser circuit L based on the result of the comparison stored in a memory MEM2.

15 Claims, 3 Drawing Sheets

5,469,464

TRANSMISSION SYSTEM FOR TRANSMITTING SIGNALS IN A BURST MODE

TECHNICAL FIELD

The present invention relates to a transmission system wherein bursts of information signals are transmitted from a transmitter in a substation to a receiver in a main station.

BACKGROUND OF THE INVENTION

Such receivers may include processing means provided with a memory and a comparator and able to execute an iterative process during each step of which it derives from a signal of the burst received from the substation a decision threshold related to a characteristic of the signal. The threshold is stored in the memory and the characteristic is compared in the comparator with a previous threshold which has been determined and stored in the memory for the substation during a previous step of the process and which is applied to the comparator.

The receiver of such a system, which is generally known in the art, is described in the article "Burst-Mode Compatible Optical Receiver With A Large Dynamic Range", by Yusuke Ota and Robert G. Swartz, published in the "Journal of lightwave technology", Vol. 8, No 12, December 1990, pp. 1897–1905. Therein the processing means determines the amplitude threshold value used to convert a received analog signal to a digital signal "on the fly", i.e. at the beginning of each burst of signals. For high-rate burst signals this implies that the processing means has to perform this operation at a correspondingly high speed and therefore has to be equipped with components allowing such a high speed operation, such components being generally expensive. Moreover, the known receiver cannot be applied in so-called point-to-multipoint systems.

DISCLOSURE OF INVENTION

An object of the invention is to provide a transmission system of the above type including a receiver of the known type, but which does not present the mentioned drawback, i.e., which does not have to perform the derivation of the threshold at a high speed and does not therefore have to be equipped with relatively expensive elements, and which is also suited for point-to-multipoint systems.

According to the present invention, a system includes a plurality of substations coupled to a main station wherein the substations are able to transmit bursts of information signals to the main station whilst the main station includes means for providing the identity of the substation which is next to transmit a signal in an assigned following time slot, and that the processing means retrieves from a memory a previous threshold for the substation which is next to transmit a signal and applies it to a comparator to be used during a following comparison with the signal, the retrieval being performed at least one time slot before the signal is received.

By using for each signal received from a transmitter in a substation a threshold value derived from a previous signal received from the same transmitter and applying this signal to the comparator before the former signal is received, the receiver in the main station has more time to retrieve the threshold from memory and to perform a derivation operation. Moreover, if the time interval between a signal and a following signal from the same transmitter is not large enough to perform the derivation operation, the next to following signal or the next to next to following signal and so on, can be used therefor.

A further characteristic feature of the transmission system, according to the invention, is that it additionally includes a control means which iteratively retrieves the decision threshold during each of the assigned timeslots, the substation which is next to transmit a signal being the one having a following timeslot assigned to it, and the comparator performing no comparison and no threshold derivation being performed by the processor when no signal is received during the timeslot.

In this way no comparison is performed when no signal is received, whilst when a signal is received it can immediately be compared with the threshold value related to its substation transmitter and while this comparison is going on, the threshold value to be used for the next comparison with the following to be received signal is retrieved and transferred to the comparator.

Another characteristic feature of the transmission system, according to the invention, is that the comparator includes two comparator circuits, first inputs of which are coupled to an input terminal of the receiver, where said signals are received, whilst second inputs thereof are coupled with the memory via respective first and second digital-to-analog convertors, the memory and said convertors being controlled by control means to alternatively apply successive ones of the previously stored values to the first inputs of the comparator circuits and the comparator additionally including switching means to alternatively connect an output of the first and second comparator circuits with an output terminal of the receiver depending on said previously stored threshold being applied to a first input of said second or the first comparator circuit, respectively. In this way the above described steps of the iterative process can be realized.

Still another characteristic feature of the transmission system, according to the invention, is that the main station includes a transmitter which is associated with the receiver and is able to send control signals to receivers located in the substations and associated with a corresponding transmitter therein, the control signals being indicative of the power value, upon receipt by the receiver in said main station, of the signals transmitted by the transmitters in said substations, and that said receivers in the substations include interpretation means to interpret the control signals, and means to control the power of the transmitted signals according to the result of the interpretation operation, thereby controlling the power of the transmitted signals to have a predetermined value.

Yet another characteristic of the transmission system, according to the invention, is that it is an optical system, and that at least one of the transmitters is able to transmit second control signals, said second control signals being digital signals comprising a predetermined first number of consecutive digital zero values indicative of the lowest peak value of the transmitted signals by the transmitter, and a predetermined second number of consecutive digital one values indicative of the highest peak value of the transmitted signals, and that said transmitter includes a backfacet diode to which the second control signal is applied, said diode generating a signal indicative of the lowest and highest peak values and thus of the high and low power value of the transmitted signals, the transmitter also including comparison means to compare the lowest and highest power values with predetermined reference values, a laser diode included in the transmitter for transmission of said information signals and of the second control signal, being controlled according to the result of the comparison.

In this way the laser diode of the transmitter is regulated to work in its optimal power range.

Since signals are sent in bursts with no transmission between two successive bursts, it is indeed not the mean power value of the laser diode which has to be regulated as for continuous transmission, but the maximum and minimum values thereof because the mean value is not garanteed to be half of the difference of these values. To allow the backfacet diode, which is a cheap diode optimized to estimate the mean power of a signal, to provide the transmitter with an indication of this maximum and minimum power value, the above mentioned special pattern of consecutive zeroes and ones is transmitted via the laser diode. In this way, the indication of the mean power values generated by the diode for the sequence of zeroes and ones approximates the latter minimum and maximum power values of the signal respectively.

The above mentioned and other objects and features of the invention will become more apparent and the invention itself will be best understood by referring to the following description of an embodiment taken in conjunction with the accompanying drawing.

BEST MODE FOR CARRYING OUT THE INVENTION

Figure 2:
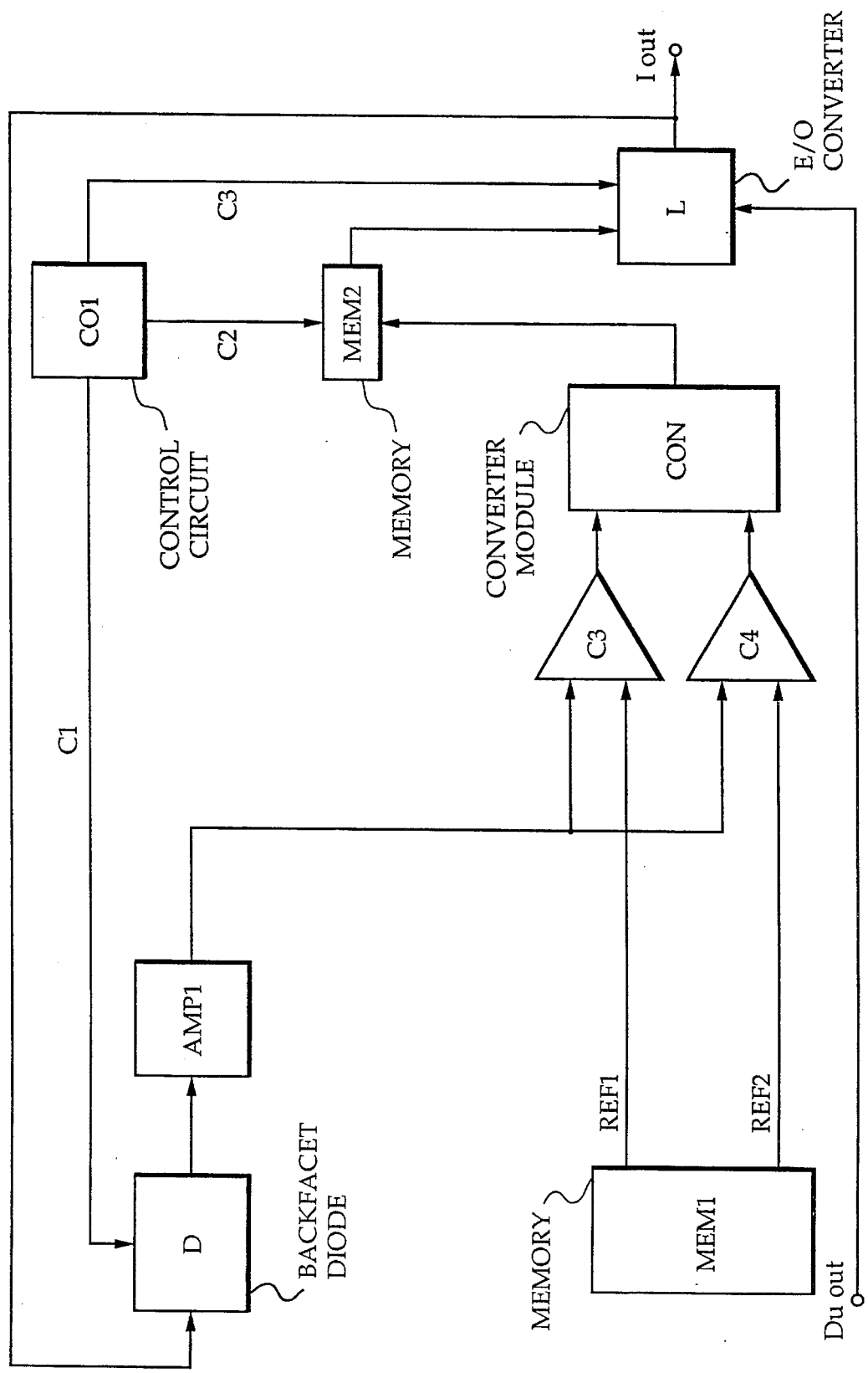
FIG. 2 shows part of a transmitter included in a substation of the system of FIG. 1.
Figure 3:
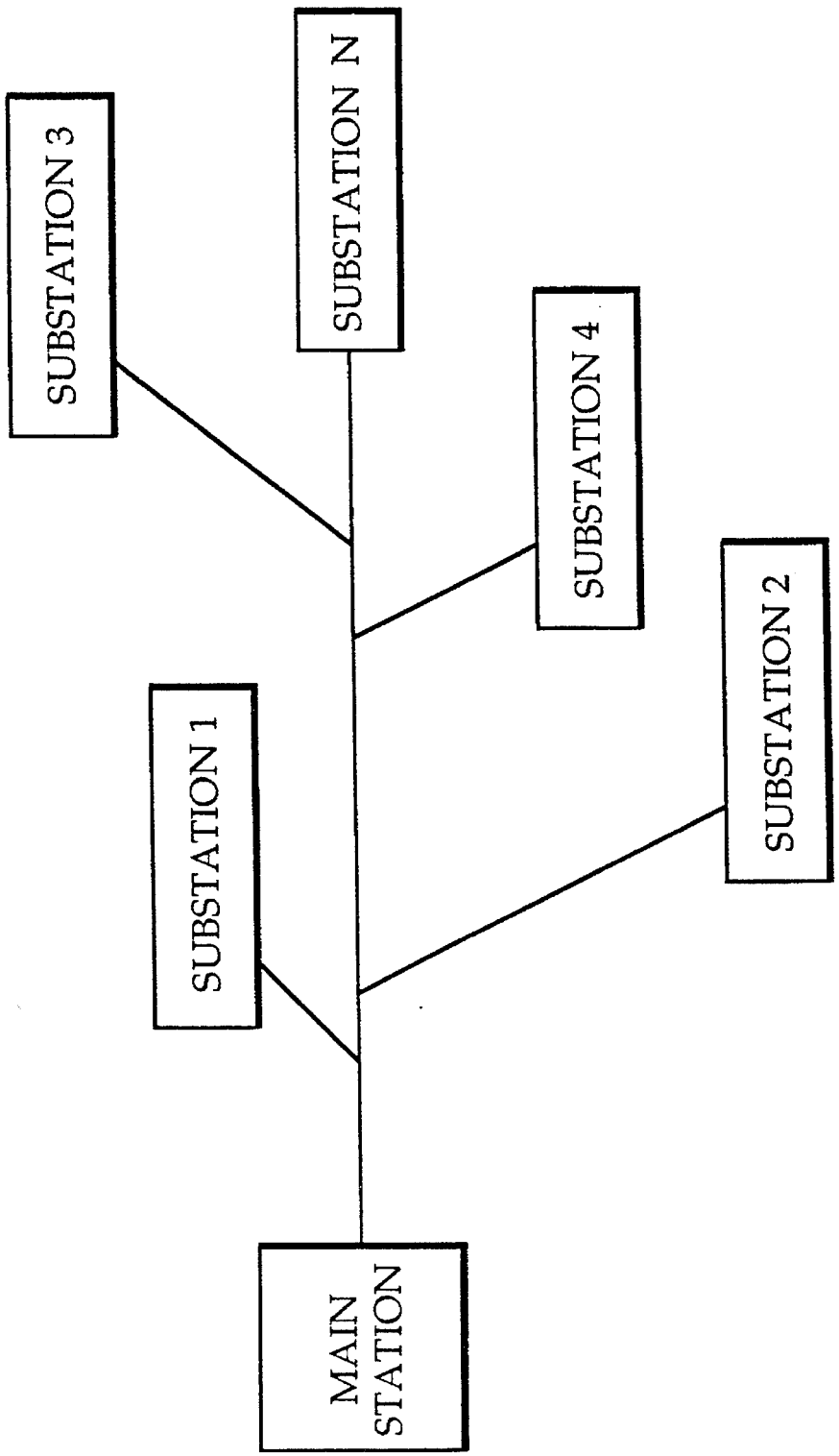
FIG. 3 shows a transmission system, according to the invention, with a main station equipped with a receiver of the sort shown in FIG. 1 and each substation equipped with a transmitter of the type shown in FIG. 2.

A transmission system is shown in FIG. 3 and includes a plurality of terminal stations or substations which are coupled to a main station via individual optical links and a common optical link, i.e. via a so-called tree structure. Each of these stations includes an optical transmitter and an optical receiver, but in FIGS. 1 and 2 only the receiver of a main station and the transmitter of a substation are shown in relative detail, respectively.

Asynchronous Transfer Mode (ATM) packets or cells are transmitted in bursts from the substations to the main station in dedicated time slots. The time slots are assigned to the substations by the main station as described in the not yet published European Patent Application No 91870197.0 (U.S. counterpart application Ser. No. 07/983/876, filed Dec. 1, 1992).

As a consequence, the main station always knows which substation is the next one to transmit a signal. When during its assigned timeslot the substation has no information to send, it transmits an idle cell. Between the bursts no substation is allowed to send and consequently the output signals of the transmitters of these substations are ignored by the main station receiver.

The above ATM cells are transmitted by the substations on optical links as optical analog signals and the latter are converted to digital signals in the receiver of the main station. To this end the amplitude of a signal received therein is compared with a threshold value substantially equal to half of the sum of the maximum and minimum amplitude value of the received signal. This implies that the main station must know the latter maximum and minimum values and that these values and consequently also the power value, or more specifically, the maximum and minimum power value of the signals transmitted by the substations have to remain substantially constant. How this is achieved is explained later.

Figure 1:
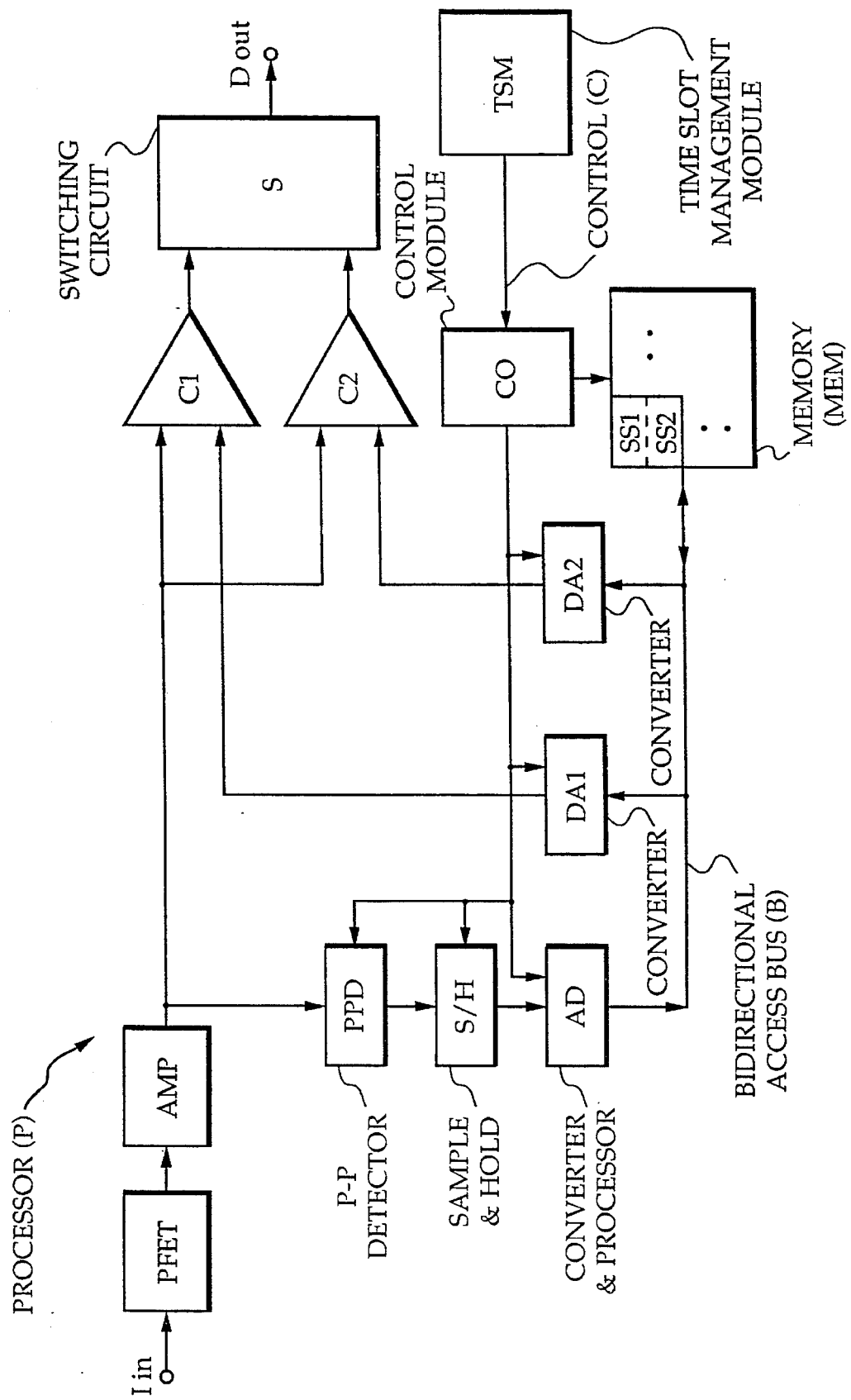
FIG. 1 represents a functional diagram of part of a receiver included in a main station of a transmission system according to the invention.

The circuit of FIG. 1 represents the receiver part of the main station which realizes the above mentioned comparison.

It includes a pinfet circuit PFET to convert an optical signal Iin received from a substation to an electrical signal. An output of the pinfet circuit PFET is coupled via an amplifier module AMP to a peak-to-peak amplitude detector PPD and to first inputs of two comparator circuits C1 and C2.

AMP amplifies the electrical signal generated by PFET and performs offset control, whilst PPD detects the maximum and minimum peak values of the amplified signal and stores these values in a sample and hold circuit S/H connected therewith. The sample and hold circuit S/H is coupled to a convertor circuitry AD including an analog-to-digital converter circuit and a processor. AD converts the peak values stored in S/H to digital signals, calculates half of the sum of these values and stores the thus obtained reference or threshold value in a memory module MEM to which it is connected via a bidirectional access bus B. The location in MEM in which this value is stored is dedicated to the substation which transmitted Iin, i.e., each substation identity is associated with an address of MEH where the threshold value applicable substation is stored as shown in FIG. 1, where SS1, SS2, and so on indicate the threshold derived fop a substation 1, 2, . . . which are stored at addresses derived from the substation identities.

Via the same data bus B MEH is also connected to an input of a first and a second digital-to-analog converter, DA1 and DA2 respectively, an output of DA1 being connected to a second input of C1, whilst an output of DA2 is connected to a second input of C2. The outputs of C1 and of C2 are connected to respective inputs of a switching circuit S, an output of which is connected to an output terminal Dout at which a digital signal Dout is generated.

PPD, S/H, AD, DA1, DA2 and S are controlled by control signals generated by a control module CO to an input of which a control signal C is applied. C is locally generated by a module TSM of a transmitter of the main station associated with the considered receiver This control signal C is at each instant in time indicative of an identity of the user terminal to which a next time slot is assigned, i.e., C indicates which user terminal is next to transmit a signal.

TSM is a time slot management module as described in the mentioned European Patent Application, which assigns the time slots to the substations.

It has to be noted that although in FIG. 1, for the sake of clarity of the figure, there is shown only one control line over which the control signals performing the above controls ape transmitted, this line in fact represents different connections to the appropriate circuits.

Following is a description of the operation of the circuit of FIG. 1.

As mentioned earlier, the optical signal Iin is converted by PFET to an electrical signal which amplified by AMP and the peak values derived therefrom by PPD and stored in S/H are converted by AD to a digital value from which the threshold value is derived and this threshold value is stored by AD in MEM under control of CO. CO has indeed to trigger PPD, S/H and AD when Iin is received and has to indicate to MEH where the calculated threshold has to be stored since, as earlier mentioned, this storage address is related to the identity of the substation which sent Iin.

In C1 and C2 the amplified signal is compared with two signal values applied to the respective second inputs thereof. One of these two values is the earlier mentioned threshold value related to the substation which sent Iin and which was earlier i.e. prior to the receipt of Iin e.g. Retrieved via DA1 from MEM and applied to C1 as will be explained hereafter. The other signal applied to C2 is a threshold value retrieved before the one applied to C1 as will also be explained hereafter.

While the comparison of Iin with its corresponding threshold value is performed by C1, CO controls MEH apply to DA2 the stored threshold value relative to the next substation to transmit a signal. As explained earlier, the main station indeed knows at each instant which substation is the next to transmit a signal and this knowledge is passed to CO via the signal C. DA2 converts the digital threshold value to an analog one and applies it to the second input of C2. In this way, when the signal sent by that next substation is received, the corresponding threshold value is already available at C2 while at the second input of C1 the previously Petrieyed threshold is then still available. In a next step a new threshold value is, in advance, applied to C1, whilst the previous retrieved threshold is still available at C2 which corresponds to the considered first described situation.

To provide at Bout the correct comparison result, i.e., in the considered above described situation the output of C1, S is upon receipt of Iin by the main station controlled by CO to alternately connect the outputs of C1 and C2 with Dout when the threshold relative to Iin is applied to C1 and C2 respectively.

In this way the signal provided at Dout is the digital equivalent of Iin, i.e., when Iin is larger than the related threshold value a 1 value is generated, when it is smaller a 0 value is generated.

It has to be noted that each time a new threshold value is calculated and stored, the previous value related to the same substation is overwritten. Also, although in the above described embodiment of the receiver of the main station the threshold value used for the comparison with a received signal from a substation is derived from an immediately preceding signal received from the same substation, this value can equally well be derived from a prior or even from a prior to prior, and so on, signal to provide for more time to perform the calculation. In this case the implementation of the circuit becomes more complicated since more than one value has to be stored for each substation and a number of calculations have to be performed in parallel.

Also, a same threshold value could be used for a number of consecutively received signals from one substation in which case a control system has to be provided to allow the calculation and storage of the reference value only after that number of signals has been received.

At start-up of the transmission system the substations first send a number of idle cells, i.e. cells without information, to allow the main unit receiver to calculate a first reference value.

It has to be noted that at the beginning of each derivation the peak detector PPD is not reset by CO to a zero value, but is preset to values which deviate slightly from the previously measured ones, i.e. the maximum and minimum values are set to a value slightly less and higher, respectively, than the previously measured ones. This because the detector is not fast enough to reach the peak values of the signal when starting from zero. For the same reason it takes a few idle cells at start up before PPD indicates the correct peak values and thus also before a correct threshold value is obtained.

Since a threshold value to be used for a signal Iin is derived from a preceding signal received from the same substation, the above described circuit only produces a correct digital signal at Dout when the amplitude of the signals received from that substation remain substantially constant. To this end the main station periodically transmits to each substation in a so-called maintenance cell or control cell an indication of the amplitude of the signals received from that station. This indication is derived from the output signal of PPD.

The maintenance cells are transmitted in the same way as normal cells and as described in the above-mentioned European patent application and they are interpreted and used by each substation unit to control the amplitude and thus also the power value of the transmitted signals.

Reference is now made to FIG. 2 for a description of a circuit included in a transmitter for instance of a substation of the system.

This circuit controls a laser diode included therein, to convert the signals to be transmitted as optical signals, to work in an optimal way. This optimal working is achieved when the power value of an optical signal generated by that diode is located within a predetermined range, i.e. its maximum power level should not exceed a predetermined upper value, whilst its minimum power level should not be smaller than a predetermined lower value, where these values depend on the characteristics of the laser diode.

In case of continuous transmission, the mean power value of the to be transmitted signals is controlled to achieve the above purpose, this mean value being equal to half of the sum of the minimum and the maximum power level. In case of bursty transmission, the mean power value cannot be guaranteed to be equal to the above half due to the dead spaces between the bursts. For this reason, both the maximum and minimum power level of the to be transmitted signal have to be controlled.

This control is realized as described hereafter, by making reference to the schematic circuit shown in FIG. 2 which is, as mentioned earlier, part of the substation optical transmitter.

This circuit includes a backfacet diode D and an amplifier circuit AMP1, two comparator circuits C3 and C4, a control circuit CO1 a convertor module CON, and two memory modules MEM1 and MEM2 which realize the above mentioned optimal working as described hereafter and a laser circuit to perform the mentioned electrical/optical conversion of the signals to be transmitted.

The backfacet diode D which is a cheap diode optimized to provide a good estimate of the mean power of a received signal is via AMP1 coupled to first inputs of the comparator circuits CS and C4 and is controlled by the control circuit CO1. The memory module MEN1 applies to second inputs of CS and C4 reference values REF1 and REF2, respectively.

The results of the comparison performed by CS and C4 are applied to respective inputs of the converter module CON an output of which is connected to an input of MEM2 which is also controlled by control CO1 circuit. An output of MEM2 is connected to an input of L converter which is again controlled by CO1, whilst an input terminal Duout is connected to another input of L and output of which is connected to Iout. Iout is optically coupled with D as indicated.

CO1 generates three control signals C1, C2, C3 applied to D, MEM2 and L, respectively. C1 enables D when a periodic second maintenance signal is sent out by L as explained hereafter; C2 indicates to MEM2 when a signal Iout, which can be the mentioned maintenance cell is transmitted and CS indicates to L that it has to transmit the mentioned second maintenance signal.

CO1 includes a timing circuit to generate C1 and C2 at predetermined time intervals and is informed by the main station of the timeslots assigned to the transmitter it is included in. On the basis of this information it generates a signal C3 each time a signal may be sent. Since the realization of CO1 is obvious from its functional description, it is not described in further details, neither are the other elements of the circuit since they consist of basis circuitry.

Following is now a description of the operation circuit of FIG. 2.

The purpose of this circuit is to derive from the above mentioned second maintenance cell a control signal to control a laser included in L to work in its optimal range. To this end and as described earlier, the minimum and maximum power values of a generated signal, more specifically of the second maintenance signal may not be smaller, or greater respectively than predetermined reference values which depend on the characteristics of the laser.

In order to obtain at an output of D and thus also at an output of AMP1 an indication of the earlier mentioned peak power values, of the second maintenance signal, this signal which is under control of C1, interpreted by D, includes a 0000FFFF hex pattern corresponding to a digital 00001111 byte pattern, so that a signal part generated by AMP1 and corresponding to the 0000 part of the pattern indicative of the minimum value of the signal whilst a signal part corresponding to the FFFF part is indicative of the maximum power value. These maximum and minimum indications are compared with the reference values REF1 and REF2, by the two comparator circuits C3 and C4, respectively. REF1 is the earlier mentioned upper value, and REF2 is the also earlier mentioned lower value.

C1 and C2 detect a low-to-high and a high-to-low transition of a signal, respectively, and compare the high and low value of that signal, respectively, with the value applied to their second input, i.e. REF1 and REF2, respectively.

The results of this comparison are converted in CON which generates the digital control signal to be stored in a memory module MEM2. Each time a signal Duout applied by a user station (not shown) to the terminal Duout has to be transmitted, Duout has to be transmitted, as indicated by the control signal C2 the digital signal is retrieved from MEM1 and applied to the laser circuit L, to control, after conversion into an analog signal, the laser diode included in the latter circuit thereby regulating the power of a signal Iout generated for transmission by the laser diode from Duout.

Under control of C3, L also periodically generates the above described 0000FFFF pattern.

It has to be noted that at start-up of the transmission system the earlier mentioned idle cells make it possible for the substation to determine a first power control signal and that the stored control signal is overwritten each time a maintenance cell is interpreted.

It has also to be noted that a laser diode included in the main station transmitter can be regulated in a similar way.

While the principles of the invention have been described above in connection with specific apparatus, it is to be clearly understood that this description is made only by way of example and not as a limitation on the scope of the invention.

We claim:

1. Transmission system wherein bursts of information input signals are transmitted from a transmitter in a substation to a receiver in a main station, said receiver including signal processing means (P) provided with a memory (MEM) and first and second comparator circuits (C1, C2), first inputs of which are coupled to an input terminal of said receiver, where said input terminals receives said input signals (Iin) from said substation, said signal processing means (P) being responsive to said input signals (Iin) for providing a decision threshold signal related to a characteristic of said input signal and storing said decision threshold signal in said memory (MEM), second inputs of said first and second comparator circuits being coupled with said memory via respective first (DA1) and second (DA2) digital-to-analog convertors, said first (DA1) and second (DA2) digital-to-analog convertors converting digital signals providing by said memory (MEM) into analog signals provided to said second inputs, each of said digital signals being indicative of a previously stored decision threshold signal, and said first and second comparator circuits comparing said characteristic of said input signal with one of said previously stored decision threshold signals, said memory (MEM) and said convertors (DA1, DA2) being controlled by control means (CO) to alternatively apply successive ones of said previously stored decision threshold signals to said second inputs of said first and second comparator circuits (C1, C2), and said signal processing means (P) additionally including switching means (S) to alternatively connect an output of said first (C1) and second (C2) comparator circuits with an output terminal (Dout) of said receiver depending on said previously stored decision threshold signal being provided to said second inputs of said second (C2) or said first (C1) comparator circuit respectively, wherein said system includes a plurality of substations for transmitting said bursts of information signals to said main station during assigned time slots, wherein said main station includes means (TSM) for providing a substation identification signal for identifying a current substation currently transmitting during a current assigned time slot and a next substation for transmitting in a next assigned time slot subsequent to said current assigned time slot, and wherein said signal processing means (P) is responsive to said substation identification signal, for retrieving from said memory, at least one time slot before receiving an input signal from said next substation, said previously stored decision threshold signal for said next substation for providing said previously stored decision threshold signal for said next substation to said first and second comparator circuits for comparing to an input signal received from said next substation.

2. Transmission system according to claim 1, wherein said characteristic of said input signal is the amplitude of said input signal.

3. Transmission system according to claim 1, wherein said decision threshold signal for a substation is provided in response to each one of said input signals received from the substation.

4. Transmission system according to claim 1, wherein for each of said substations, said decision threshold signal is provided in response to each n th input signal received from said substation, where n is an integer multiple of a number of input signals received from said substation.

5. Transmission system according to claim 1, wherein upon storage in said memory (MEM) of said decision threshold signal a previously stored decision threshold signal for a same substation is overwritten.

6. Transmission system according to claim 1, wherein said control means (CO) retrieves said decision threshold signal during said current assigned time slots corresponding to said next substation, and in response to an absence of an input signal during said next assigned time slot, said first and second comparator circuits (C1, C2) perform no comparison and said signal processing means (P) does not provide a decision threshold signal.

7. Transmission system according to claim 2, wherein said input signal has a minimum value and a maximum value, said signal processing means being responsive to said minimum value and said maximum value for providing said decision threshold signal equal to half of a sum of said minimum value and said maximum value, and said signal processing means (P) including a detection circuit (PPD) to detect said minimum value and said maximum value.

8. Transmission system according to claim 1, wherein said system is an optical system.

9. Transmission system according to claim 1, wherein said main station includes a main station transmitter which is associated with said receiver and is responsive to said receiver receiving said input signals for providing control signals to substation receivers located in said substations and associated with a corresponding transmitter therein, said control signals being indicative of a power value of a received input signal.

10. Transmission system according to claim 9, wherein said substation receivers include interpretation means responsive to said control signals for controlling the power of said burst of information signals.

11. Transmission system according to claim 9, wherein said system is an optical system and that at least one of said transmitters is able to transmit second control signals, said second control signals being digital signals comprising a predetermined first number of consecutive digital zero values indicative of a lowest peak power value of said bursts of information signals transmitted by said transmitter, and a predetermined second number of consecutive digital one values indicative of a highest peak power value of said bursts of information signals transmitted by said transmitter, and that said transmitter includes a backfacet diode (D) to which said second control signal (MC) is provided, said diode (D) for providing a power value signal indicative of said lowest and highest peak power values, said power value signal being indicative of a low power value and a high power value of said input signals, said transmitter also including second comparison means (C3, C4) to compare said lowest and highest power values with predetermined reference values, and a laser diode (L) for transmission of said bursts of information signals and of said second control signal, said laser diode being controlled according to a result of said comparison.

12. Transmission system according to claim 11, wherein at start-up of said system said transmitters in said substations transmit a plurality of preliminary signals to enable said receiver in said main station to derive a first decision threshold signal for each of said transmitters and to enable said transmitter to adjust the power of said transmitted bursts of information signals to obtain a first power value thereof.

13. Transmission system according to claim 1, wherein said bursts of information signals are asynchronous transfer mode signals.

14. Transmission system according to claim 12, wherein said preliminary signals are constituted by idle asynchronous transfer mode cells.

15. Transmission system according to claim 12, wherein said transmitters are responsive to the absence of bursts of information signals during their assigned time slots for sending idle cells.

* * * * *